US008602712B2

(12) United States Patent
Ritson

(10) Patent No.: US 8,602,712 B2
(45) Date of Patent: Dec. 10, 2013

(54) DEMOUNTABLE VEHICLE BODY SYSTEM

(76) Inventor: Peter Alvin Ritson, Merseyside (GB)

( * ) Notice: Subject to any disclaimer, the term of this patent is extended or adjusted under 35 U.S.C. 154(b) by 0 days.

(21) Appl. No.: 12/993,814

(22) PCT Filed: May 21, 2009

(86) PCT No.: PCT/GB2009/001300
§ 371 (c)(1),
(2), (4) Date: Nov. 19, 2010

(87) PCT Pub. No.: WO2009/141630
PCT Pub. Date: Nov. 26, 2009

(65) Prior Publication Data
US 2011/0076122 A1 Mar. 31, 2011

(30) Foreign Application Priority Data
May 21, 2008 (GB) .................................. 0809195.1

(51) Int. Cl.
*B60P 1/64* (2006.01)
(52) U.S. Cl.
USPC ........... 414/500; 414/478; 414/494; 254/279; 254/290
(58) Field of Classification Search
USPC .......... 254/279, 280, 290, 292; 414/477, 478, 414/494, 500, 506, 559
See application file for complete search history.

(56) References Cited

U.S. PATENT DOCUMENTS

| | | | | |
|---|---|---|---|---|
| 1,730,480 A * | 10/1929 | Shirreff | .......................... | 414/522 |
| 2,021,952 A * | 11/1935 | Wren | ............................. | 414/500 |
| 3,826,391 A * | 7/1974 | Prince | ........................... | 414/477 |
| 4,180,362 A * | 12/1979 | Stair | ........................... | 414/139.5 |
| 4,666,127 A * | 5/1987 | Allen | ........................... | 254/281 |
| 5,246,330 A | 9/1993 | Marmur | | |
| 5,361,565 A * | 11/1994 | Bayer | ........................... | 254/292 |
| 5,460,473 A | 10/1995 | LaMora | | |
| 5,509,775 A * | 4/1996 | Kendall | ....................... | 414/437 |
| 5,755,549 A * | 5/1998 | Ogrodnick | .................... | 414/500 |
| 5,921,742 A * | 7/1999 | Gearhart | ....................... | 414/480 |
| 6,406,231 B1 * | 6/2002 | Landoll et al. | .................. | 410/66 |
| 7,284,744 B1 * | 10/2007 | Lerchenmueller et al. | ... | 254/278 |

FOREIGN PATENT DOCUMENTS

| | | | |
|---|---|---|---|
| EP | 0075307 A1 | | 3/1983 |
| JP | 63-255140 A | * | 10/1988 |
| WO | WO 9108925 A1 | | 6/1991 |
| WO | WO 9602403 A2 | | 2/1996 |

* cited by examiner

*Primary Examiner* — James Keenan
(74) *Attorney, Agent, or Firm* — SoCal IP Law Group LLP; Mark A. Goldstein

(57) ABSTRACT

This invention relates to a demountable vehicle body system, in which a variety of different body types can be mounted and demounted from a vehicle chassis or trailer to enable a single vehicle chassis or trailer to be utilized for a variety of different purposes. In particular, the present invention relates to a demountable vehicle body system for motor vehicles and trailers which provides for a convenient and cost effective use of a variety of vehicle body types. Advantageously, the present invention provides a demountable vehicle body system that is capable of safely mounting or demounting a wide variety of vehicle body types, including fully-loaded heavy bodies, in a smooth and efficient manner. The vehicle body system described herein can be mounted or demounted in a matter of minutes by a single operator.

19 Claims, 14 Drawing Sheets

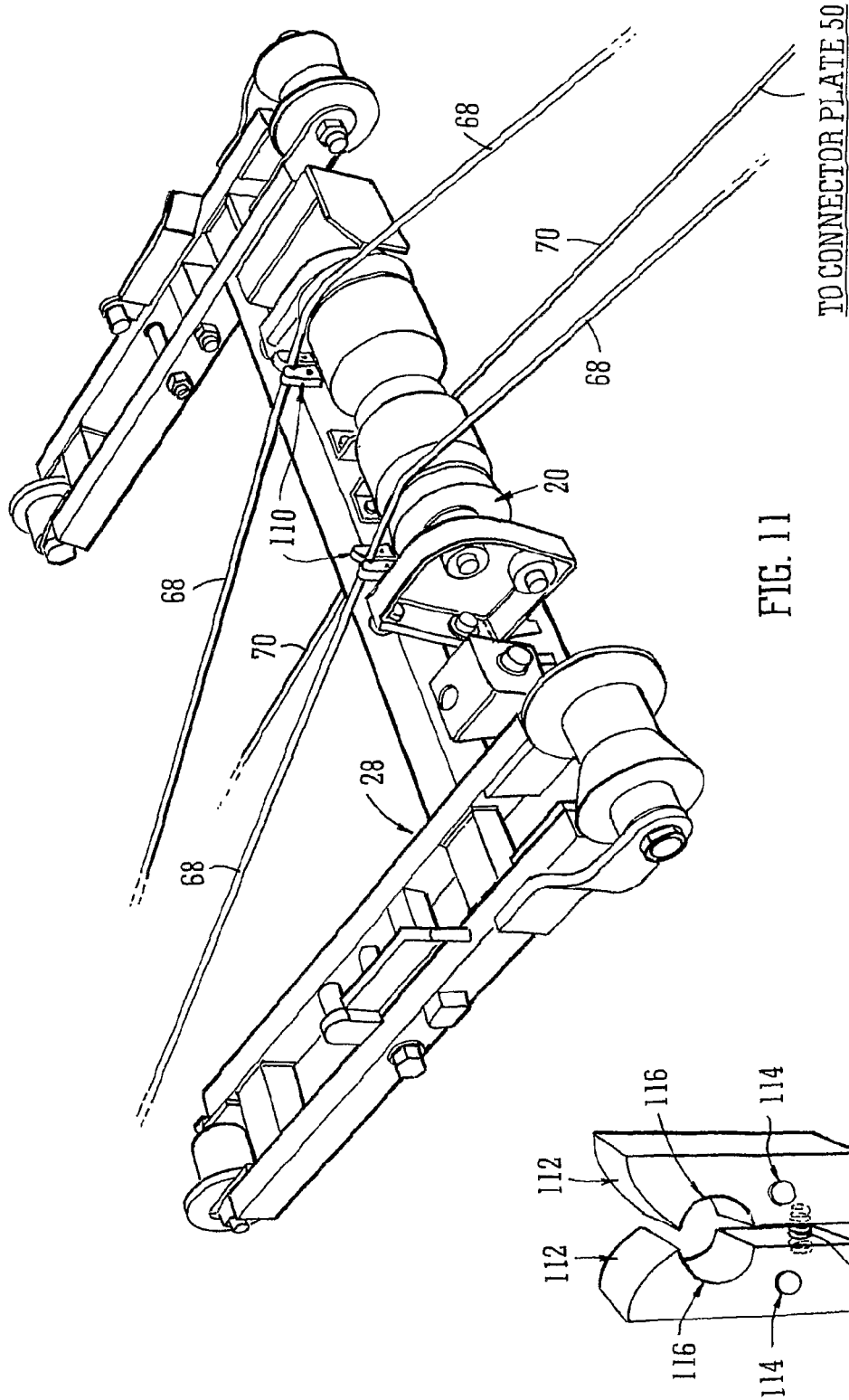

DEMOUNTABLE VEHICLE BODY SYSTEM

RELATED APPLICATION INFORMATION

This patent claims priority from International PCT Patent Application No. PCT/GB2009/001300, filed on May 21, 2009 entitled, "DEMOUNTABLE VEHICLE BODY SYSTEM", which claims priority to GB Application No. GB0809195.1, filed on May 21, 2008 entitled "DEMOUNTABLE VEHICLE BODY SYSTEM".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The present invention relates to a demountable vehicle body system, in which a variety of different body types can be mounted and demounted from a vehicle chassis or trailer to enable a single vehicle chassis or trailer to be utilised for a variety of different purposes.

At the present time commercial vehicles are usually manufactured having a standard front cab and a variety of standard rear cab types, including, for example, a box cab, a Luton cab, a flat deck or a tipper. In addition, a plurality of specialised rear cabs can be supplied to order and these might include refrigerated rear cabs, minibuses, horse boxes, cement mixers, breakdown lorries, street light lifts, bowsers and the like for liquid or bulk material or live stock carrying cabs. Generally, as a consequence, as the individual body type is normally provided as an integral part of the rear portion of the vehicle, each vehicle is generally suitable only for the purpose for which it was designed, therefore, the user of a variety of different types of vehicle would require to have a number of each vehicle types for this purpose, even though it is unlikely that all of the vehicles will need to be used at all the times and such an arrangement can involve a considerable capital outlay for a fleet user.

Also, over the past few decades many parts of the world have experienced a gradual reduction in working hours and a consequent increase in leisure time. Many of these resulting leisure and cultural activities take place outdoors and at selected venues where spectator seating, toilet and catering facilities are not organised on a permanent basis. Increasingly, there is the need for facilities such as catering stands, mobile grandstands, mobile toilets etc. and there are systems available in the marketplace in which rear cabs are detachable from the vehicle by means of legs which are extendable and which raise the rear cab from the vehicle, which is then subsequently driven away. However, these tend to be time consuming to unload and do not allow the rear cab to be dropped to ground level.

A further example of a prior art arrangement is known in GB 2 240 751, which was made by the inventor of the present application. Basically, this system comprises a support frame attachable to the vehicle and a demountable body frame on which various vehicle bodies can be secured. The vehicle body frame can be removed from the vehicle by means of a cable winch mechanism driving an endless cable mechanism, the endless cable mechanism being connectable to the demountable body via a coupling member. Whilst this invention was commercially successful, the disadvantage of this approach was that the inertia of "heavier" body types tended to cause the vehicle body to jerk and move irregularly during mounting or demounting operations.

It is therefore the object of the present invention to provide a demountable vehicle body system for motor vehicles and trailers which overcomes the disadvantages of prior art arrangements and provides for a convenient and cost effective use of a variety of vehicle body types. In use, it is a further object of the present invention to provide a demountable vehicle body system that is capable of safely mounting or demounting a wide variety of vehicle body types, including fully-loaded heavy bodies, in a much smoother and efficient manner. The vehicle body system described herein can be mounted or demounted in a matter of minutes by a single operator.

According to the present invention there is provided a vehicle body exchange system for vehicles or trailers, comprising:
 a support frame attachable or integrally mounted with a vehicle chassis or trailer unit, said support frame capable of receiving a vehicle body;
 a first winch means connected to a coupling member for connection to a vehicle body to enable said vehicle body to be lifted from the ground or lowered to the ground during a mounting or demounting operation;
 a second winch means connected to a coupling member for connection to a vehicle body to enable said vehicle body to be lifted from the ground or lowered to the ground during said mounting or demounting operation; and
 means for independently controlling the rotational speed of said first and second winch means during said mounting or demounting operation to enable a smooth displacement of said vehicle body.

Preferably, the chassis frame comprises at least two guide rails or channel sections for receiving and guiding corresponding channels or guide rails on the demountable body frame. The chassis frame may also include a tilt frame which pivots in the direction of motion of the body frame relative to the chassis frame. In use, the coupling member for connection to a vehicle body may be provided as a connector plate.

Towards the rear of the chassis frame, a rear cable guide roller and an auxiliary guide roller can be provided which, in use, guide the cables when performing said mounting or demounting operation. Guide rails and corresponding guide rollers may, preferably, enable the body frame to connect with the chassis frame during mounting or demounting operations. A further set of guide rails may be provided along the chassis frame to ensure that the body frame is pulled on squarely and securely.

Further preferably, a lock release handle is mounted on the chassis frame which is engaged when the body frame is mounted securely on the chassis frame.

Preferably, the vehicle body is secured on a body frame. The body frame may consist of two L-shaped guide rails, which, in a mounted condition, sit on the guide rails of the chassis frame. Towards the rear of the body frame, either fixed rolled wheels or additional torsion wheels can be inserted into the body frame. The body frame may also have means for receiving the connector plate which is connected to the first and second winch means. In use, the connector plate is secured via locking bar. Preferably, the connector plate can be quickly ejected via a spring-loaded release mechanism which is activated by using a connector plate ejector.

Further preferably, the first winch means comprises a first motor which turns, via a gear mechanism, a single cable drum that is mainly used to pull the vehicle body off the vehicle. The first motor may be an induction motor capable of being pulled out when no power is applied.

Preferably, the second winch means comprises a second motor which turns, via a gear mechanism, a twin cable drum that is mainly used to pull the vehicle body on to the vehicle. The second motor may be a winch motor which cannot be pulled out when no power is applied.

In use, the means for independently controlling the rotational speed of said first and second winch can be provided using a microcontroller or microprocessor. A plurality of sensors detect the relative position of the vehicle body relative to the chassis frame and these are inputted to the microcontroller or microprocessor. In use, these comprise a first sensor, which can be a microswitch, and its function is to detect when the body frame is locked in position on the chassis frame; a second sensor, which can be a microswitch, which senses when the body frame is in an unlocked position; a third sensor, which can be a capacitive sensor, that is used to notify when the body frame is located on the chassis frame; and a fourth sensor, which can be a capacitive sensor, which senses when the body frame is at the rear of the cable guide roller.

Further preferably, any number of vehicle body types can be utilised, for example, a box cab, a Luton cab, a flat deck, tipper, refrigerated rear cab, minibus, horse box, cement mixer, breakdown lorry, street light lift, bowsers and the like for liquid or bulk material, live stock carrying cabs, catering stands, mobile grandstands or mobile toilets.

Also according to the present invention there is provided a computer program product for controlling the mounting or demounting of a vehicle body relative to a support frame which is attachable or integrally mounted with a vehicle chassis or trailer unit, said support frame having first and second winch means mounted thereon and connected to a coupling member for connection to the vehicle body to enable said vehicle body to be lifted from the ground or lowered to the ground during a mounting or demounting operation, comprising:

computer program means for monitoring the position of said vehicle body relative to said support frame; and computer program means for independently controlling the rotational speed of said first and second winch means to enable a smooth displacement of said vehicle body.

It is believed that a demountable vehicle body system for motor vehicles and trailers in accordance with the present invention at least addresses the problems outlined above. In particular, the advantages of the present invention are that demountable vehicle body system for motor vehicles and trailers is provided which provides for a convenient and cost effective use of a variety of vehicle body types. Advantageously, the present invention provides a demountable vehicle body system that is capable of safely mounting or demounting a wide variety of vehicle body types, including fully-loaded heavy bodies, in a much smoother and efficient manner. Further advantageously, the vehicle body system described herein can be mounted or demounted in a matter of minutes by a single operator.

It will be obvious to those skilled in the art that variations of the present invention are possible and it is intended that the present invention may be used other than as specifically described herein.

A specific non-limiting embodiment of the invention will now be described by way of example and with reference to the accompanying drawings, in which:

DESCRIPTION OF THE DRAWINGS

FIG. 11 is a perspective view from the rear which shows further detail of the tilt frame, mounted at the rear of the chassis frame, and the rear cable guide roller which is used to guide the cables when performing a mounting or demounting operation; and FIG. 12 is a perspective view from the front of one of the spring retaining clips which are used to retain the cables over the rear cable guide roller, in use.

DETAILED DESCRIPTION

Figure 1:
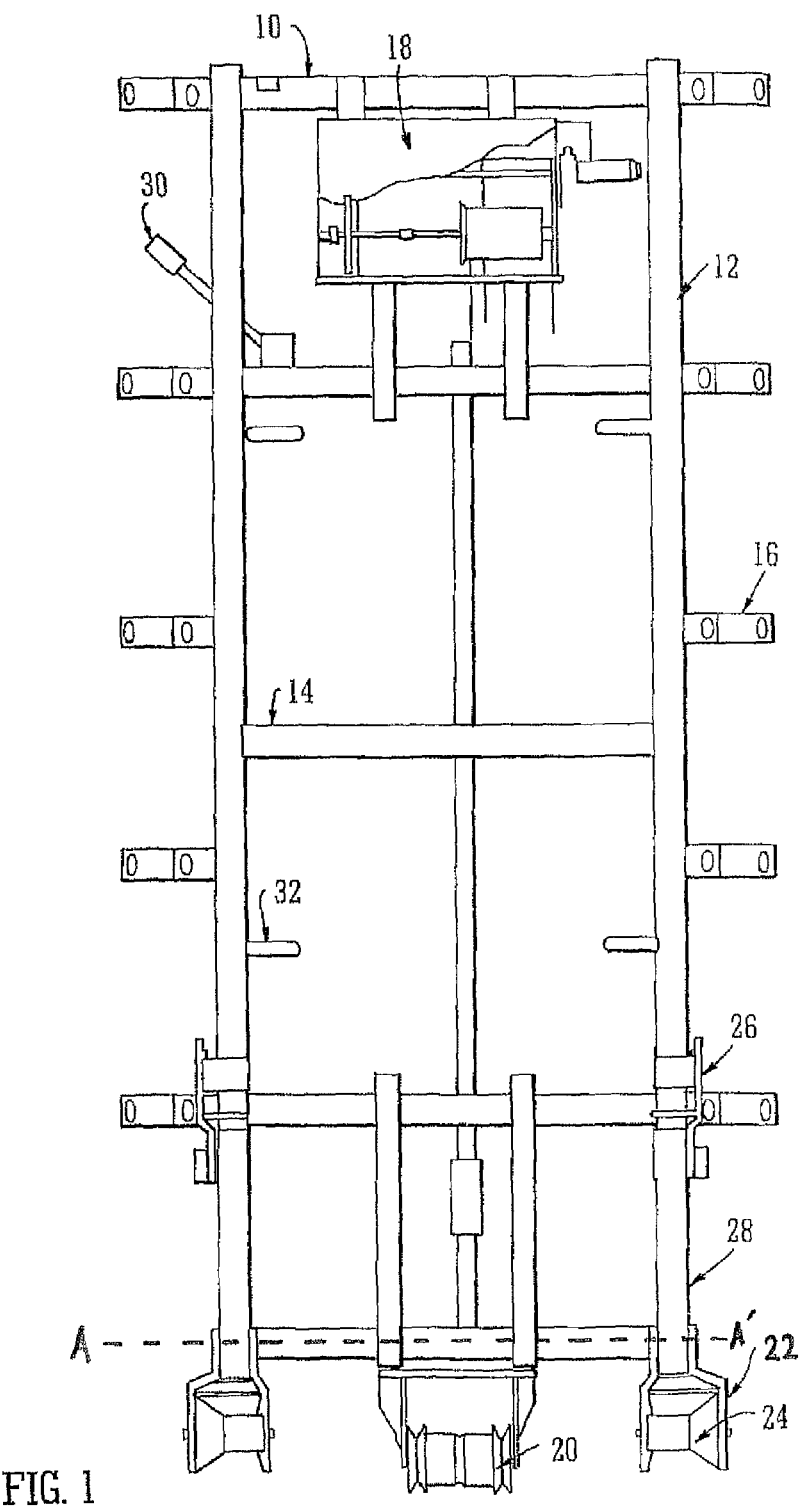
FIG. 1 shows a plan view from above of the chassis frame, which, in use, is attachable or integrally formed with a vehicle chassis or mounted on a trailer in accordance with the present invention.
Figure 2:
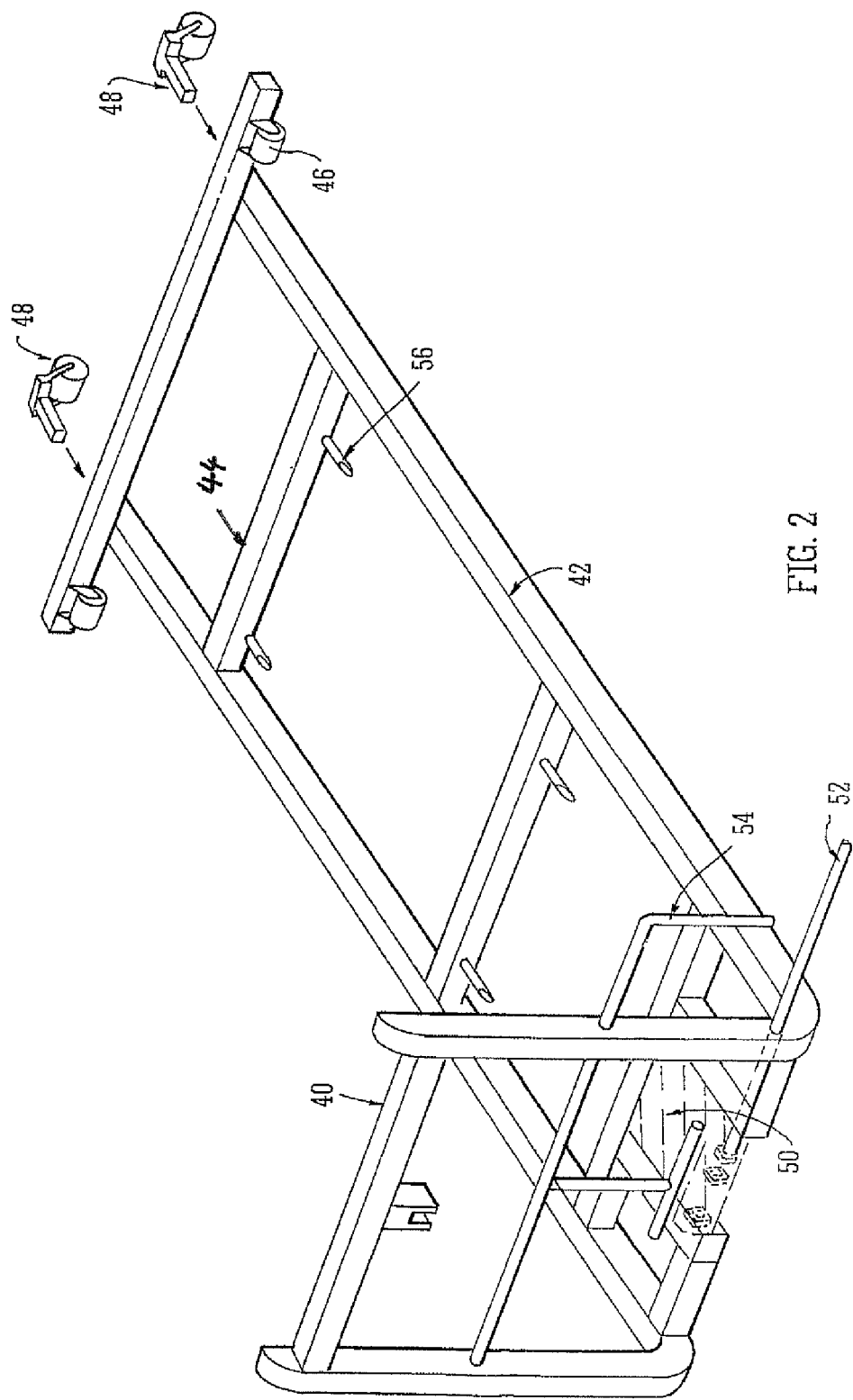
FIG. 2 is a perspective view from the side of a vehicle body frame, which, in use, is capable of receiving any number of vehicle body types in accordance with the present invention.

Referring now to the drawings, the implementation of the present invention is shown in FIGS. 1 to 10. Referring firstly to FIG. 1, which shows detail of the chassis frame 10 which, in use, is intended to be attachable or integrally formed with a vehicle chassis (not shown) or mounted on a trailer (not shown). The chassis frame 10 comprises at least two guide rails 12 or channel sections for receiving and guiding corresponding channels or guide rails 42 on the demountable body frame 40, as shown in FIG. 2. The guide rails 12 are strengthened by a number of cross-pieces 14. The chassis frame 10 is secured to the vehicle chassis (not shown) or mounted on a trailer (not shown) via a plurality of mounting means 16. At the front end of the chassis frame 10 (the cab end), a cable winch mechanism or winch box 18 is provided for mounting and demounting the body frame 40, and further detail is provided in FIGS. 3 and 4. For clarity purposes, the cables are not shown in FIG. 1.

Towards the rear of the chassis frame 10, a rear cable guide roller 20 is provided which is used to guide the cables when performing a mounting or demounting operation. Guide rails 22 and corresponding guide rollers 24 enable the body frame 40 to connect with the chassis frame 10 during mounting or demounting operations. A further set of guide rails 26 is provided along the chassis frame 10 to ensure that the body frame 40 is pulled on squarely and securely. FIG. 1 also shows detail of the pivotable tilt frame 28 which assists with the smooth operation of the mounting and demounting of vehicle bodies. The tilt frame 28 is pivotable or tiltable along the line AA' in FIG. 1.

FIG. 1 also shows is a lock release handle 30 which is engaged when the body frame 40 is mounted securely on the chassis frame 10, and which causes a lock action through points 32. In this way, the body frame 40 can be rapidly secured for transport.

FIG. 2 shows detail of the vehicle body frame 40, on which, in use, various types of vehicle bodies (not shown) can be mounted. The body frame 40 consists of two L-shaped guide rails 42 which, in a loaded condition, sit on the guide rails 12 of the chassis frame 10. Again, cross-members 44 provide structural support. Towards the rear of the body frame are either fixed rolled wheels 46, or if heavier bodies are envisaged, then additional torsion wheels 48 can be inserted into the body frame 40. The body frame 40 also has means for receiving a connector plate 50 which is connected to the cable winch mechanism 18 on the chassis frame 10 via cables (not shown). In use, the connector plate 50 is secured via locking bar 52. The connector plate can be quickly ejected via a spring-loaded release mechanism which is activated by using the connector plate ejector 54. Further detail of the connector plate and its method of operation will be discussed later in relation to FIGS. 8A to 8G and 9A to 9I. Also mounted on the body frame 40 are locking pins 56 which mount with the apertures 32 on the chassis frame 10, as described above.

Figure 3:
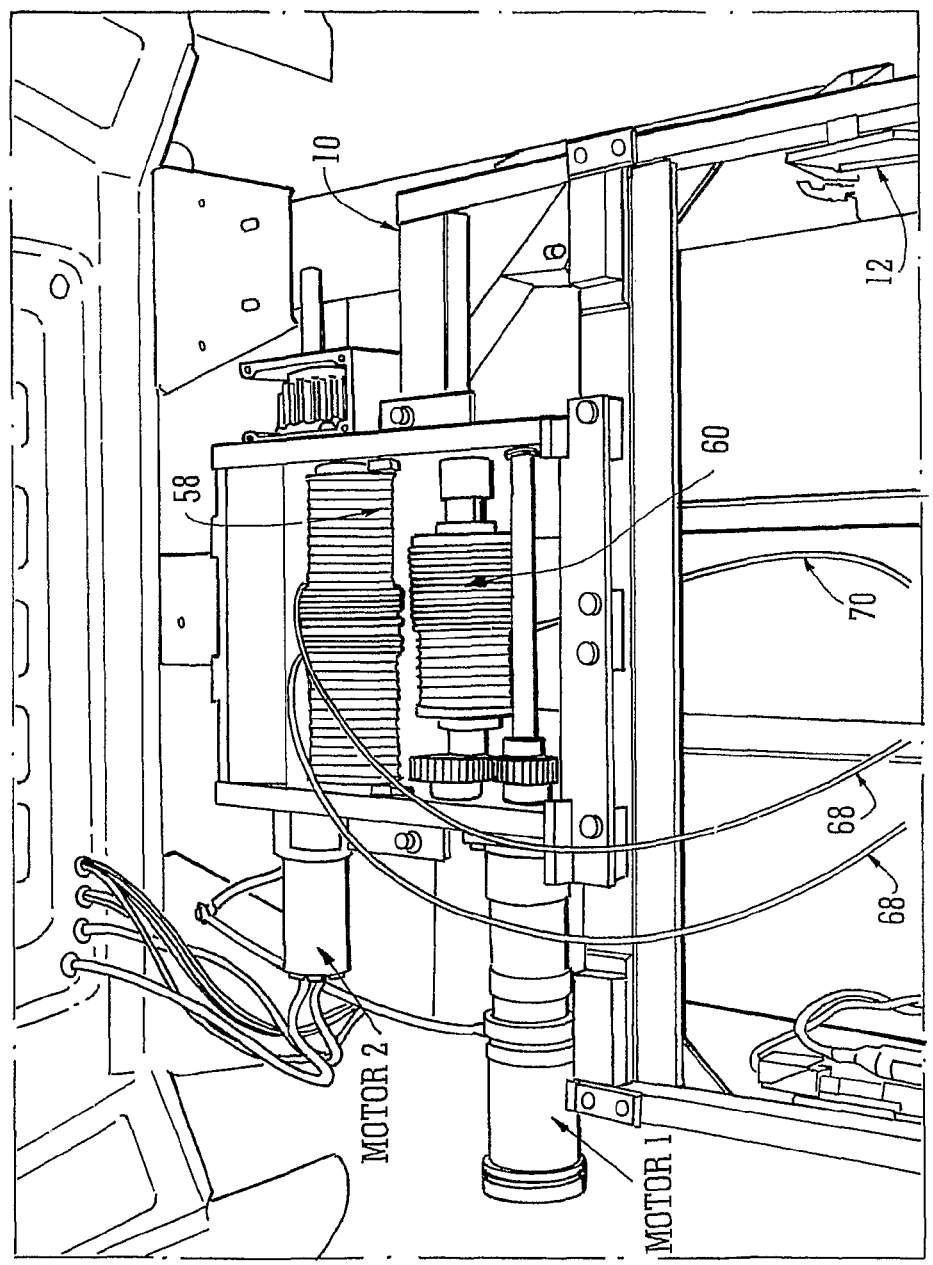
FIG. 3 shows detail of the winch cable mechanism in accordance with the present invention.

FIG. 3 shows detail of the winch box 18 that is used to pull the vehicle body 40 on and off the vehicle. Motor 1 turns, via a gear mechanism, a single cable drum 60 that is mainly used to pull the vehicle body 40 off the vehicle. It is an induction motor capable of being pulled out when no power is applied. Motor 2 turns, via a gear mechanism, a twin cable drum 58 that is mainly used to pull the vehicle body on to the vehicle. This is a winch motor which cannot be pulled out when no power is applied. Obviously this is from a safety point of view should power be lost during a winching mechanism.

The key to smooth operating of the present invention is the difference in performance and configuration of the motors 1 and 2. As mentioned, motor 1 has a single cable drum 60 that the cable 70 is fed down the full length of the vehicle to the rear, round the pulley 20 and back to fix to the connector plate 50. It is capable of being pulled out when no power is applied. Some force is required to pull out the cable, in use, maintaining tension on the cable.

Motor 2 is the main lifting motor and has two cables 68 on its drum 58. It is attached directly to the connector plate 50. This is a winch motor which can feed out or in under power. When no power is applied the drum 58 is locked, this feature is critical to the safe operation of the system. When feeding out cable 68, the drum 58 cannot be accelerated by applying tension to the cable 68.

Figure 4A:
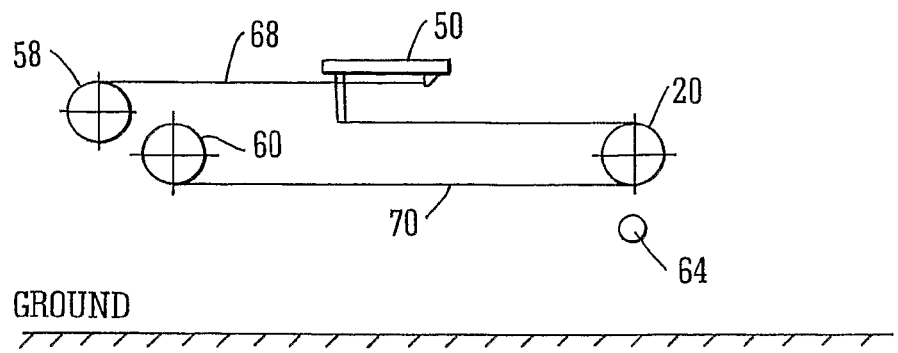
FIGS. 4A to 4C show schematically how a connector plate, which is used to connect to the vehicle body frame, can be raised and lowered using the winch cable mechanism of FIG. 3.
Figure 4B:
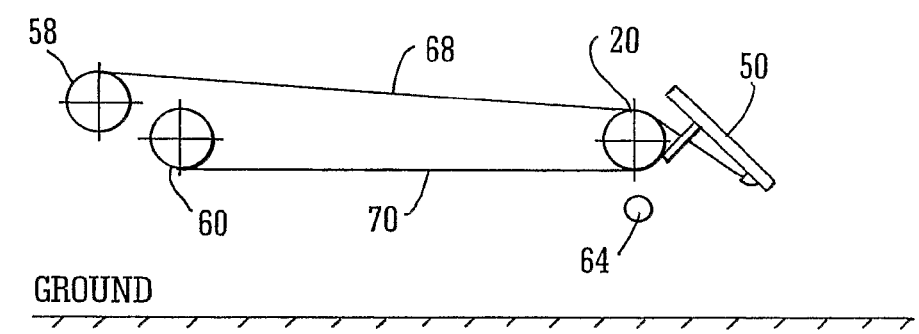
Figure 4C:
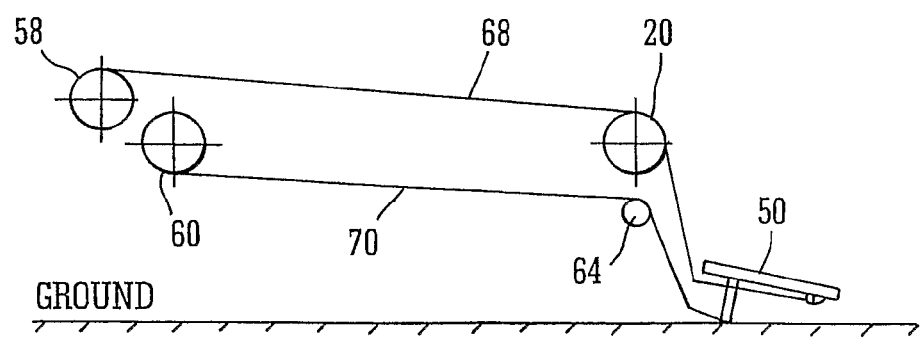

FIGS. 4A to 4C show the principle of operation of the invention without any detail of the chassis frame 10 or body frame 40 shown in these drawings, as this aids the explanation of the invention. Mounted on the chassis frame 10 (not shown), inside the winch box 18 (not shown), are the ON and OFF drums 58 and 60, respectively, which connect with the connector plate 50 via ON and OFF cables 68 and 70, respectively. As noted above, in use, the connector plate 50 would be secured in the body frame 40 (not shown). Towards the rear of the chassis frame 10 is the cable guide roller 20 and an auxiliary guide roller 64. FIGS. 4A to 4C show the demount operation as follows:

In FIG. 4A, the ON and OFF drums 58 and 60 are driven, via motors 2 and 1, respectively, and the ON and OFF drums 58 and 60 rotate clockwise. The OFF drum 60 takes up OFF cable 70 drawing the connector plate 50 (which is connected to the body frame 40) to the rear. The ON drum 58 pays out cable 68 subject to dynamic braking or under torque.

Figure 6:
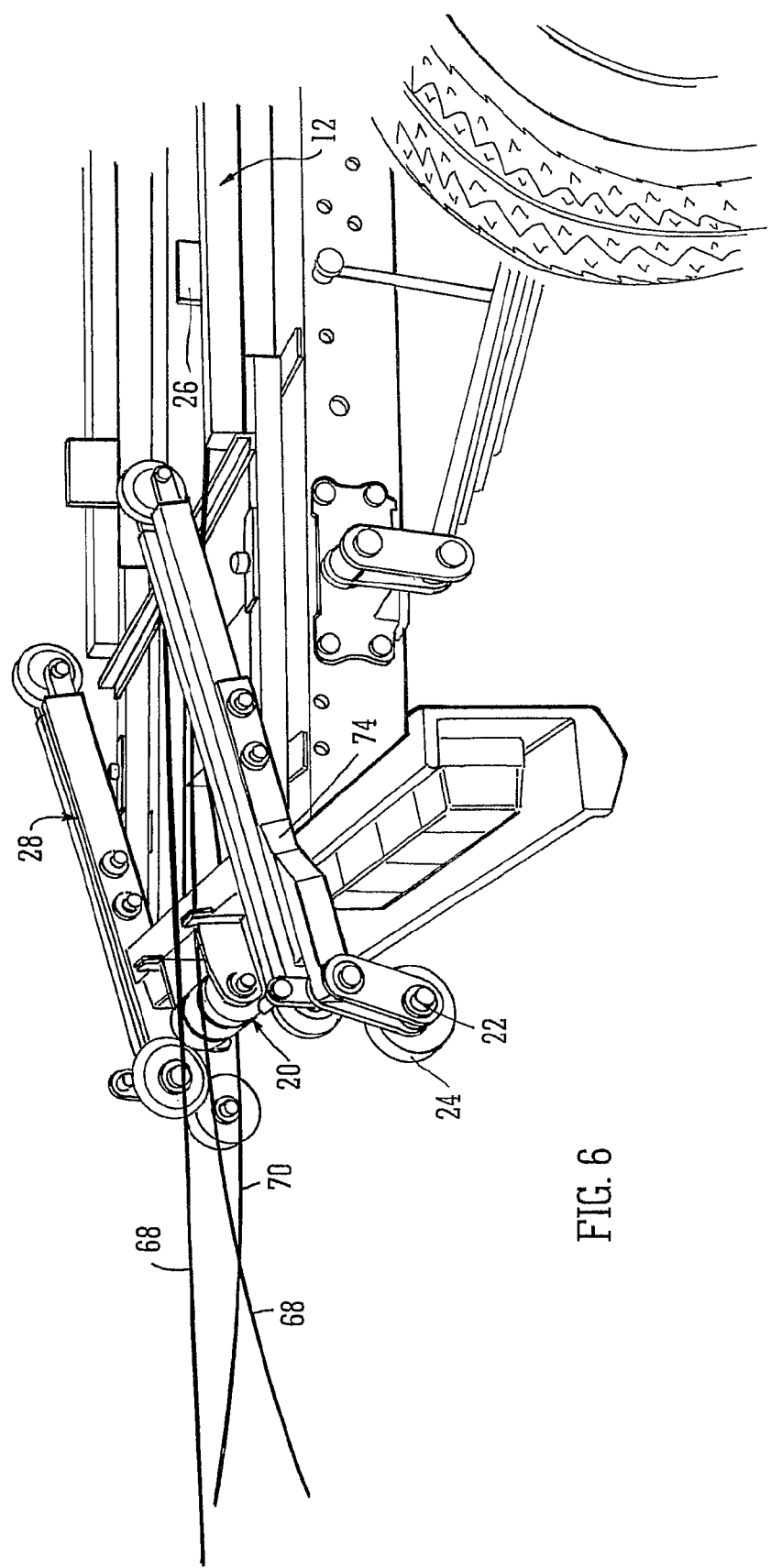
FIG. 6 shows a perspective view from the side of the tilt frame, mounted at the rear of the chassis frame, which is used to provide a smooth operation when mounting or demounting a vehicle body frame.

As the body frame 40 is drawn to the rear of the chassis frame 10, the tilt frame 28 (not shown) begins to tilt, the torque and downward force of the OFF cable 70 pulls (as the centre of gravity of the body is being transferred), the rear of the tilt frame 28 in a downward motion, thereby sensing and controlling the angle and speed of tilt of the moving body prior to the front of the body frame and body, reaching the top dead centre of the tilt frame rear rollers 74 (as shown in FIG. 6).

At this point, as shown in FIG. 4B, the body frame 40 reaches the extreme rear of the cable guide roller 20 of the tilt frame 28 (beyond top dead centre). A sensor gives indication, or drum revolution counter, to power motor 2 and the ON drum cables 68 now take the mass and continues to rotate in a clockwise direction lowering the load to the ground.

At the same time, the OFF drum 60 is disengaged and the continual downward motion of the body frame 40 causes the OFF drum 60 to unwind allowing the OFF cable 70 to be drawn by the load to the ground, as shown in FIG. 4C. There will be minimum slack cable in the OFF drum 60.

Figure 5A:
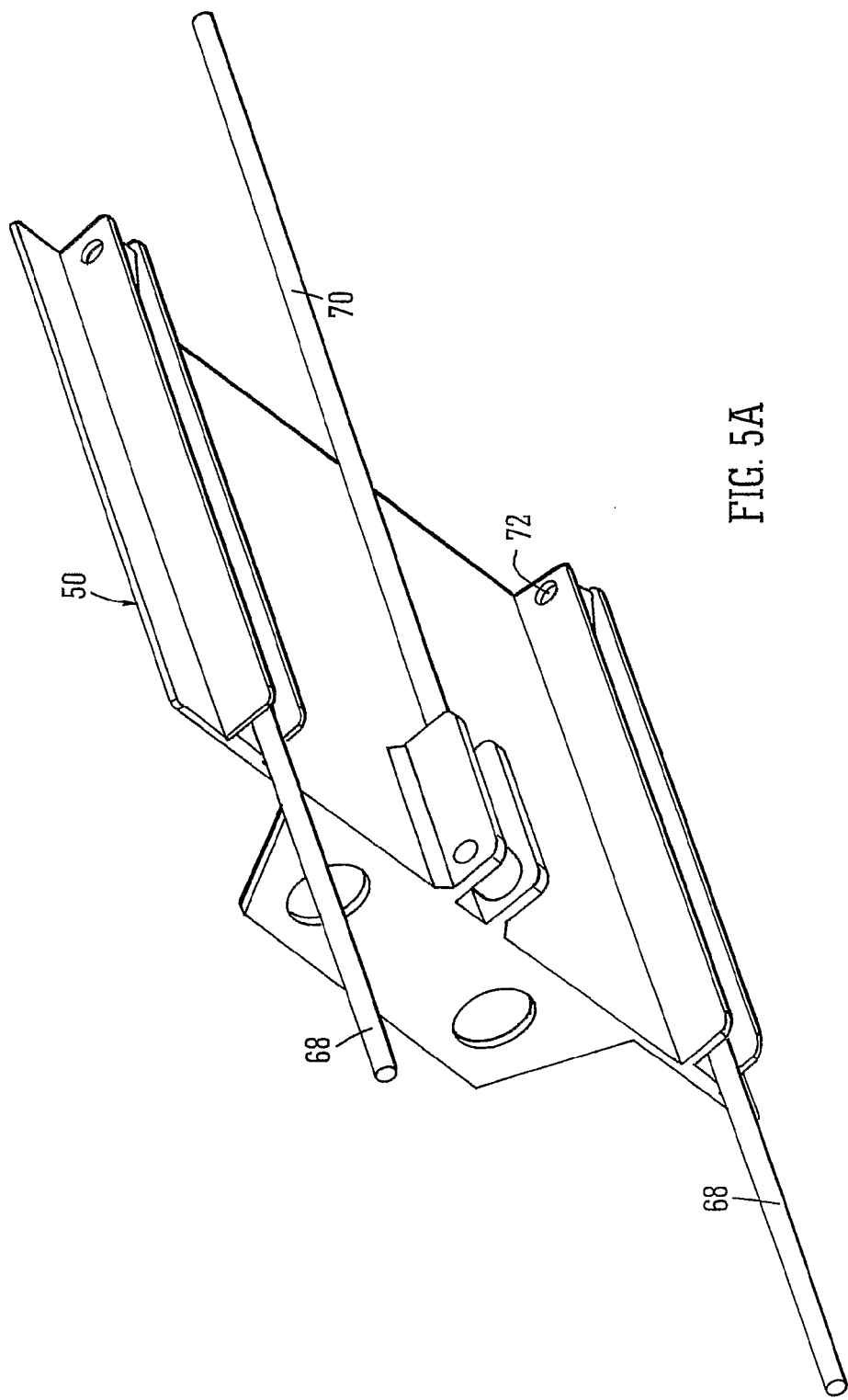
FIGS. 5A and 5B show perspective views from below and above, respectively, of the connector plate which is used to connect to the vehicle body frame.
Figure 5B:
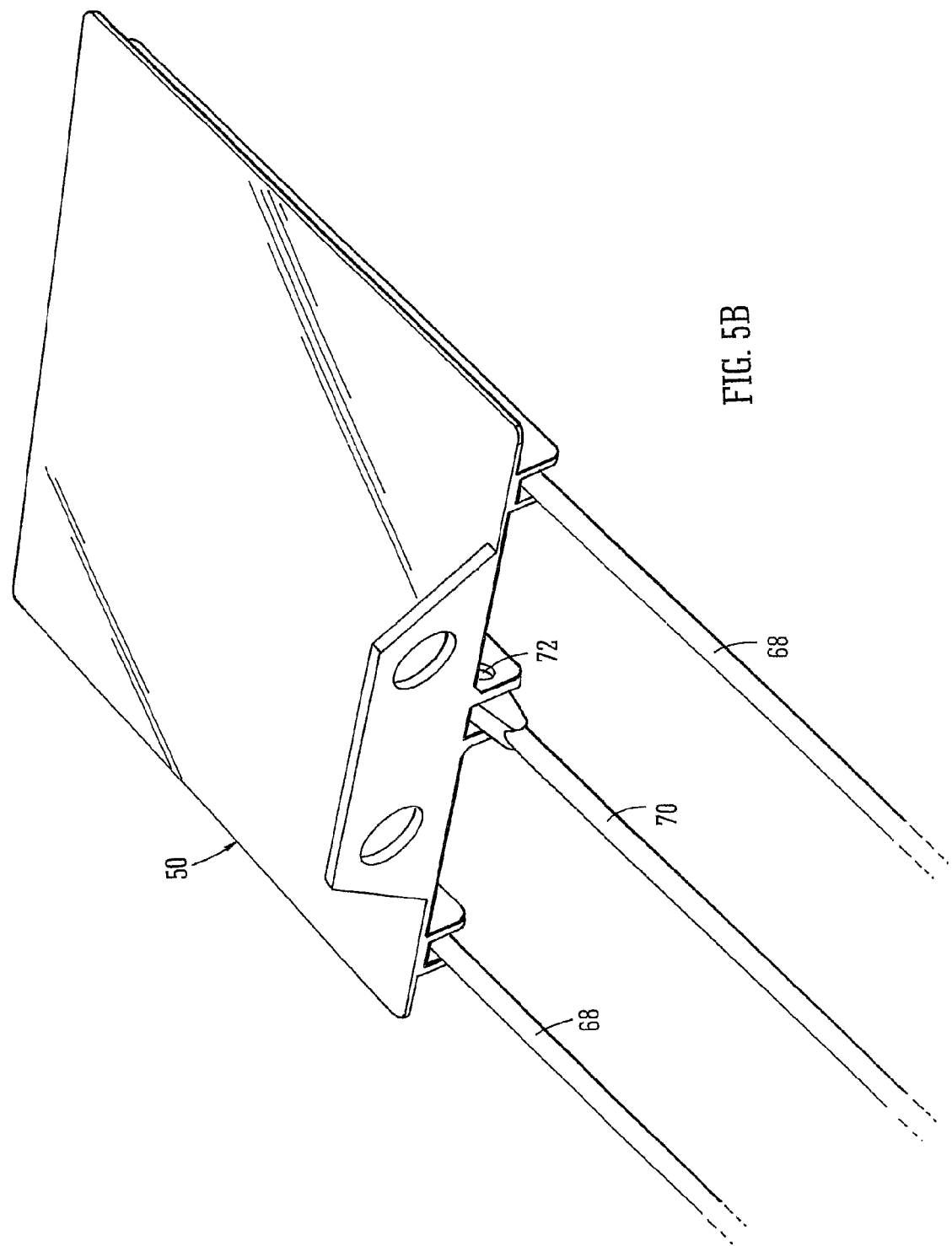

FIGS. 5A and 5B show further detail of the connector plate 50 which is used to couple the ON and OFF cables 68 and 70 to the body frame 40. As shown in FIG. 5A, which corresponds to FIG. 3A which shows the connector plate 50 being withdrawn across the chassis frame 10. FIG. 5B shows the position of the ON and OFF cables 68 and 70 on the connector plate 50 when the body 40 is lowered over the rear roller 20 and as it reaches the ground. It is the interaction of the cables 68 and 70, via the pivots 72, which assists in the smooth operation of the invention.

FIG. 6 shows further detail of the tilt frame 28 mounted at the rear of the chassis frame 10. As can be clearly seen, the tilt frame 28 is able to pivot or tilt along pivot 74. At the end of the tilt frame 28, the guide rails 22 and corresponding guide rollers 24 enable the body frame 40 to connect with the chassis frame 10 during mounting or demounting operations. FIG. 6 is also useful in showing how the ON and OFF cables 68 and 70 are situated above and below the roller 20, respectively, when the connector plate 50 is extended.

Figure 7:
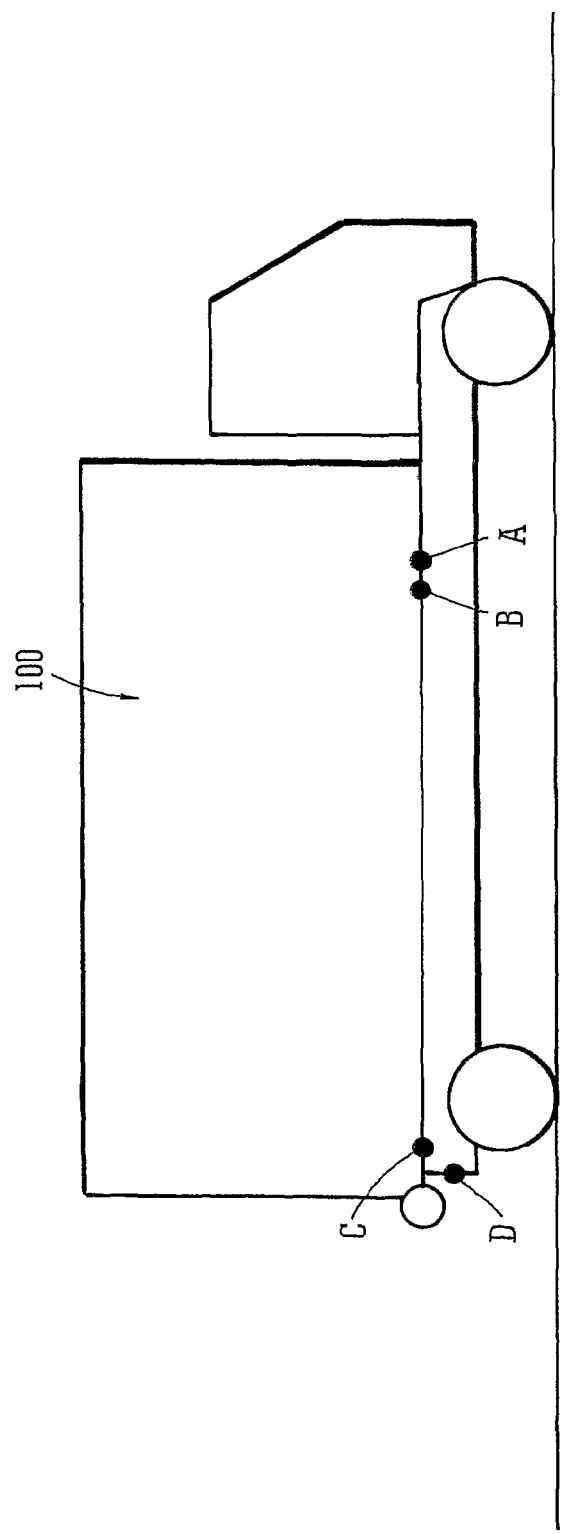
FIG. 7 shows a schematic view of the position of various sensors which are used to provide control signals to the winch cable mechanism when mounting and demounting.

FIG. 7 shows a schematic view of the location of the sensors used with the present invention. In particular, Sensor A is a microswitch and its function is to detect when the body frame 40 is locked in position on the chassis frame 10. Sensor B is a also microswitch which senses when the body frame 40 is in an unlocked position. Sensor C is a capacitive sensor that is used to notify when the body frame 40 is located on the chassis frame 10. Sensor D is again a capacitive sensor which senses when the body frame 40 is at the rear of the cable guide roller 20. The key to the smooth operation of the present invention is the accurate measurement of the body frame 40 relative to the chassis frame 10, particularly via sensors C and D. As described above in FIGS. 4A to 4C, the switching points of motors 1 and 2 is set by Sensors C and D. Due to the wrap of the cables 68 and 70 at the rear of the chassis frame these switching points are critical. For example, during a mounting operation, sensor D detects the body as the body approaches the underside of the cable guide roller 20. At this point, the OFF cable 70 attached to motor 1 is at its minimum length. From this point, the OFF cable 70 attached to motor 1 must be pulled out by motor 2.

Figure 8A:
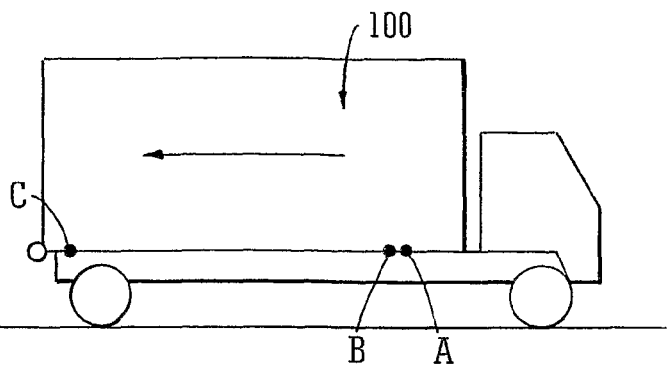
FIGS. 8A to 8G show schematic views of the how the present invention is utilised to demount a vehicle body frame.

FIGS. 8A to 8G show schematically the unloading (or demounting) sequence performed by the present invention. In FIG. 8A, the body frame 40 (not shown) having vehicle body 100 mounted thereon, is unlocked by releasing locks using manual handle 30 (not shown). The body 100 moves back on chassis frame away from locks.

As shown in Table 1, motor 1 speed exceeds motor 2 speed. This forces the speed of motor 1 to be controlled by the maximum feed rate of motor 2. The cables 68 and 70 are always kept in tension with no slack cable allowed to develop. The movement of the body 100 is controlled by the tension in the cables 68 and 70.

TABLE 1

| Active Sensors: | Motors: |
| --- | --- |
| A. Body in lock position<br>B. Locks disengaged<br>C. Body on vehicle | 1. 90% power feeding in<br>2. 100% power feeding out |

Figure 8B:
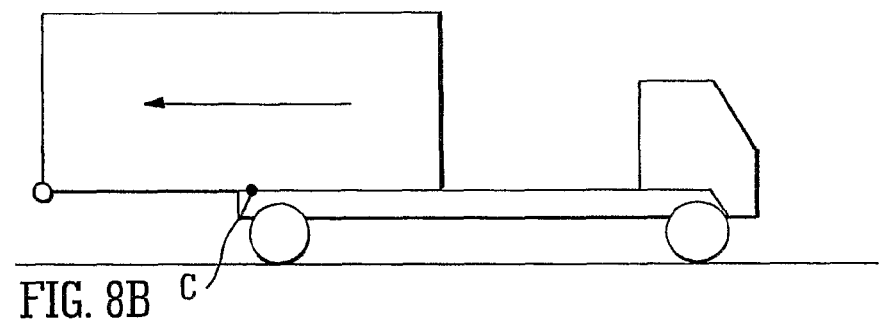

As shown in FIG. 8B, the body 100 continues to move towards the rear of the vehicle. As shown in Table 2, motor 1 speed continues to exceed motor 2.

TABLE 2

| Active Sensors: | Motors: |
| --- | --- |
| C. Body on vehicle | 1. 90% power feeding in<br>2. 100% power feeding out |

Figure 8C:
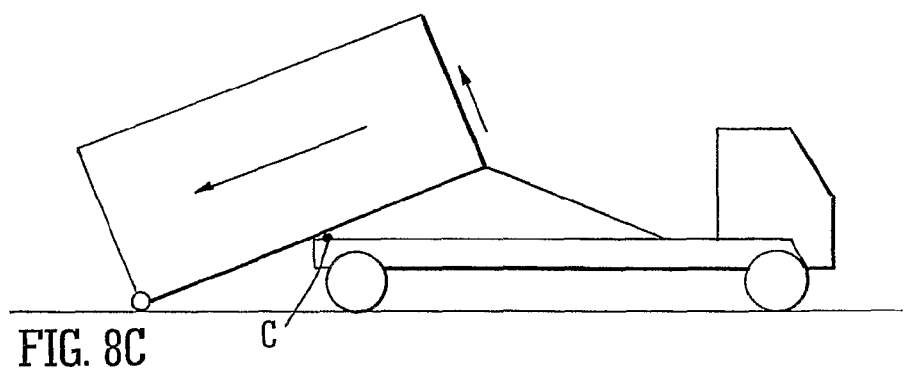

As shown in FIG. 8C, the body 100 tilts; the speed of which is controlled by motor 2. As the body 100 tilts the amount of tilt of the body 100 is controlled by the feed rate of motor 2 and the tension applied to the OFF cable 70 by motor 1. As shown in Table 3, motor 1 speed continues to exceed motor 2.

TABLE 3

| Active Sensors: | Motors: |
| --- | --- |
| C. Body on vehicle | 1. 90% power feeding in<br>2. 100% power feeding out |

Figure 8D:
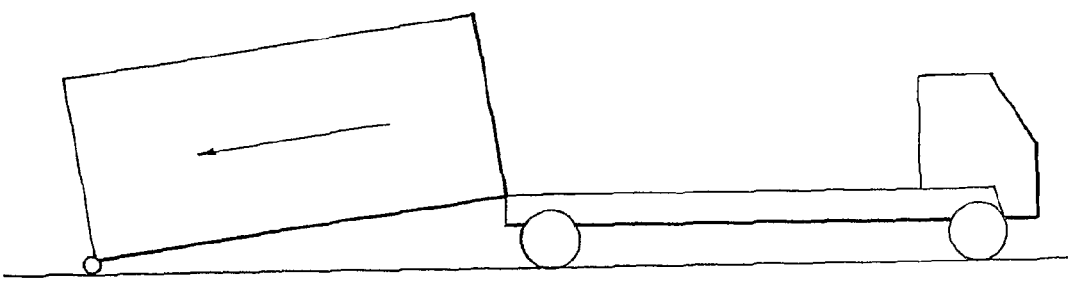

As the body 100 clears sensor C, at FIG. 8D, motor 1 is reversed. The speed of motor 1 is set to be a fraction below motor 2's payout. This prevents slack cables 68 and 70 as they are pulled around the rear roller 20 (not shown). At this point, gravity is used to carry the body 100 off the vehicle. Table 4 shows the feed-rate of motors 1 and 2.

TABLE 4

| Active Sensors: | Motors: |
| --- | --- |
| None | 1. 75% power feeding out<br>2. 100% power feeding out |

Figure 8E:
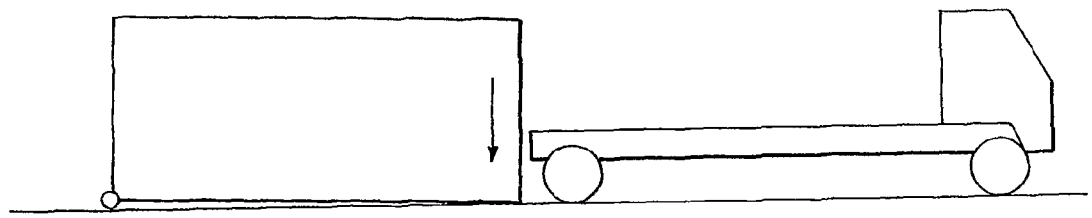

In FIG. 8E, the body 100 is lowered to ground. As the body 100 lowers under gravity, motor 2 accelerates above motor 1's speed taking up any slack cables 68 and 70 in the system. Once the OFF cable 70 attached to motor 1 becomes tight, motor 1 acts as a brake slowing the body 100 decent. The speed of decent will be a function of the body 100 loading, motor 1 resistance and motor 2 feed-out rate. Table 5 shows the feed-rate of motors 1 and 2.

TABLE 5

| Active Sensors: | Motors: |
| --- | --- |
| None | 1. 75% power feeding out<br>2. 100% power feeding out |

Figure 8F:
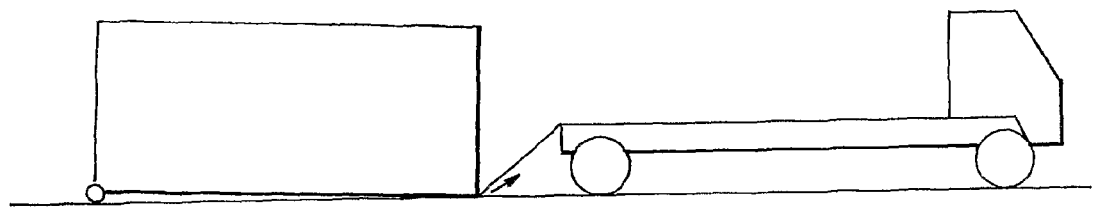

At FIG. 8F, the connector plate 50 (not shown) is ejected manually from vehicle by the operator. Both motors 1 and 2 are deactivated, as shown in Table 6.

TABLE 6

| Active Sensors: | Motors: |
| --- | --- |
| None | None |

Figure 8G:
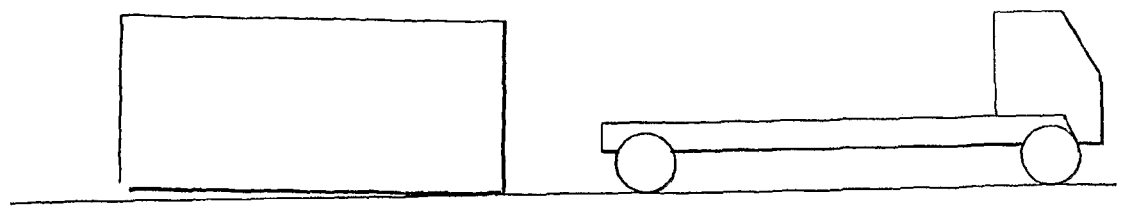

At FIG. 8G, the slack cables 68 and 70 are recovered and connector plate 50 stored. The vehicle can then be simply driven away. Table 7 shows the feed-rate of motors 1 and 2 at this point.

TABLE 7

| Active Sensors: | Motors: |
| --- | --- |
| None | 1. 80% power feeding in<br>2. 100% power feeding in |

Figure 9A:
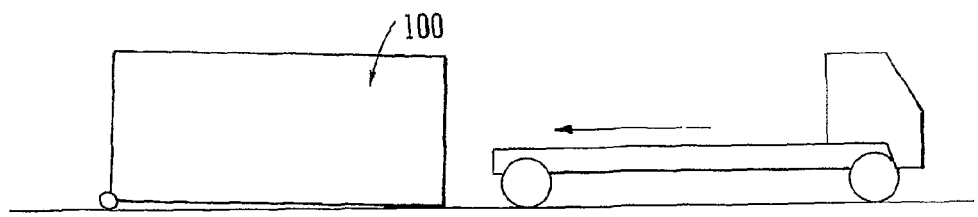
FIGS. 9A to 9I show schematic views of the how the present invention is utilised to mount a vehicle body frame.

Correspondingly FIGS. 9A to 9I show the reverse operation for loading or mounting the body 100 on to a vehicle. In FIG. 9A, the vehicle approaches the body 100. Both motors 1 and 2 are deactivated, as shown in Table 8.

TABLE 8

| Active Sensors: | Motors: |
| --- | --- |
| None | None |

Figure 9B:
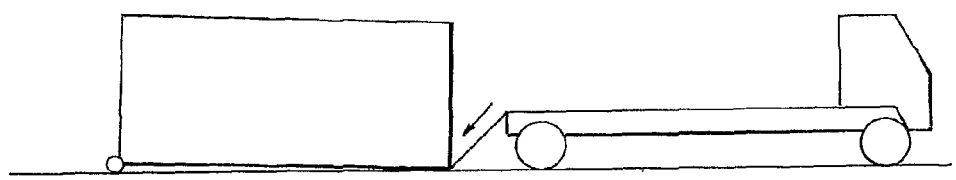

At FIG. 9B, the operator then presses the feed button (not shown) on rear of vehicle, which feeds out cables 68 and 70. Table 9 shows the feed-rate of motors 1 and 2 at this point.

TABLE 9

| Active Sensors: | Motors: |
| --- | --- |
| None | 1. 80% power feeding out<br>2. 100% power feeding out |

Figure 9C:
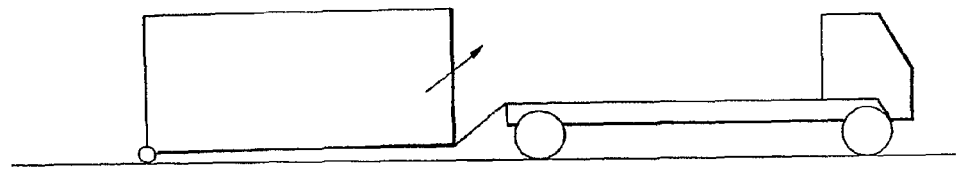

FIG. 9C shows the body 100 being is pulled towards vehicle, aligning itself. Motor 1 speed is set to exceed motor 2 speed to take up any possible slack in cables 68 and 70. Motor 1 is not capable of lifting the body 100 at its full speed and as it comes under load its speed slows down matching motor 2 speed. As motor 2 has a fixed feed rate and its power at this speed exceeds that of motor 1 the cables 68 and 70 are kept tight while motor 2 carries out the main lifting and pulling of the body 100 with motor 1 contributing. Table 10 shows the feed-rate of motors 1 and 2.

TABLE 10

| Active Sensors: | Motors: |
| --- | --- |
| None | 1. 90% power feeding in<br>2. 100% power feeding in |

Figure 9D:
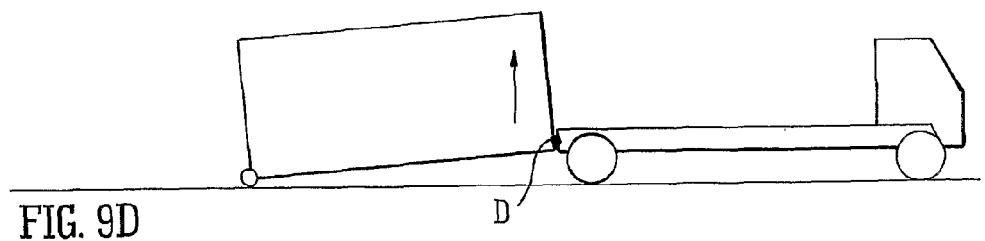

When the body triggers Sensor D, at FIG. 9D, motor 1 is disconnected. The OFF cable 70 attached to motor 1 is at its minimum length at this point. Motor 1 can be pulled out by motor 2 once all slack is taken. Table 11 shows the feed-rate of motors 1 and 2 at this point.

TABLE 11

| Active Sensors: | Motors: |
| --- | --- |
| D: Body at top rear of vehicle | 1. 0% (able to be pulled out) |
|  | 2. 100% power feeding in |

Figure 9E:
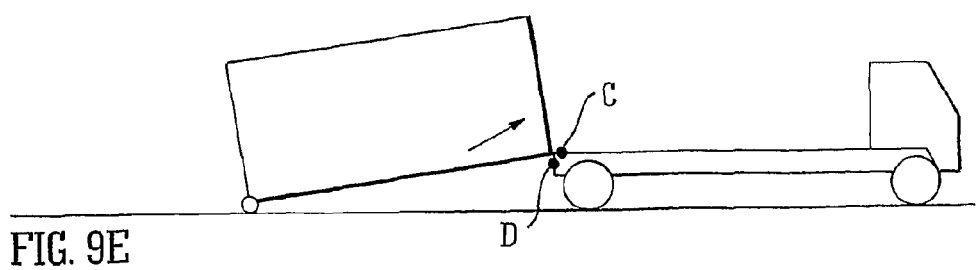

As shown in FIG. 9E$_1$ as the body 100 comes over back of vehicle both sensors C and D are used to detect the body 100. Detection of the body 100 by sensors C and D must overlap. Table 12 shows the feed-rate of motors 1 and 2.

TABLE 12

| Active Sensors: | Motors: |
| --- | --- |
| C: Body on vehicle | 1. 0% (able to be pulled out) |
| D: Body at top rear of vehicle | 2. 100% power feeding in |

Figure 9F:
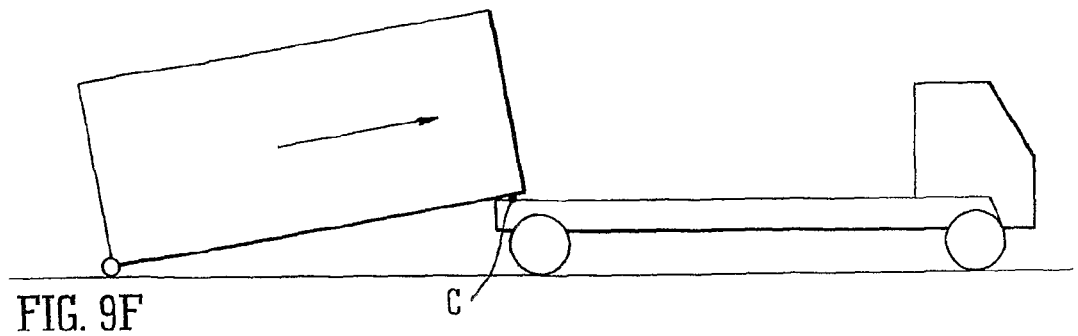

FIG. 9F shows that as the body 100 clears the back of vehicle, sensor C continues to detect body 100 on the vehicle. Table 13 shows the feed-rate of motors 1 and 2 at this point.

TABLE 13

| Active Sensors: | Motors: |
| --- | --- |
| C: Body on vehicle | 1. 0% (able to be pulled out) |
|  | 2. 100% power feeding in |

Figure 9G:
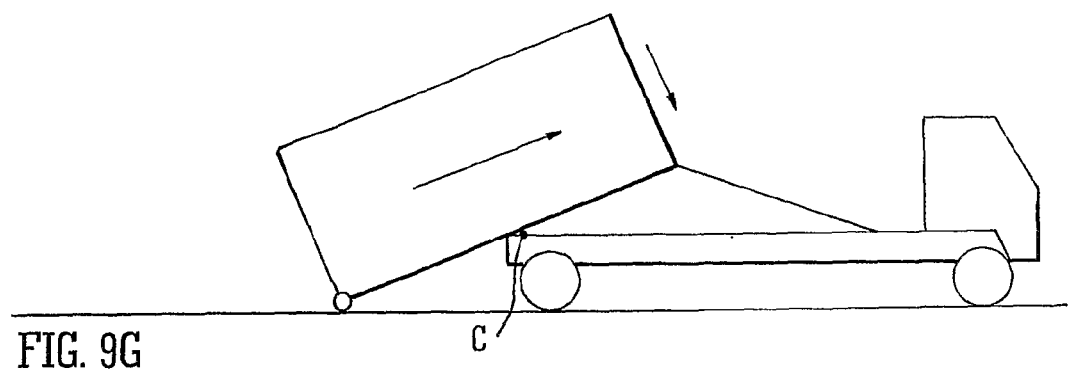

As the body 100 is pulled onto the vehicle, as shown in FIG. 9G, the tilt is controlled by motor 2 and tension in motor 1 cable 70. Table 14 shows the feed-rate of motors 1 and 2.

TABLE 14

| Active Sensors: | Motors: |
| --- | --- |
| C: Body on vehicle | 1. 0% (able to be pulled out) |
|  | 2. 100% power feeding in |

Figure 9H:
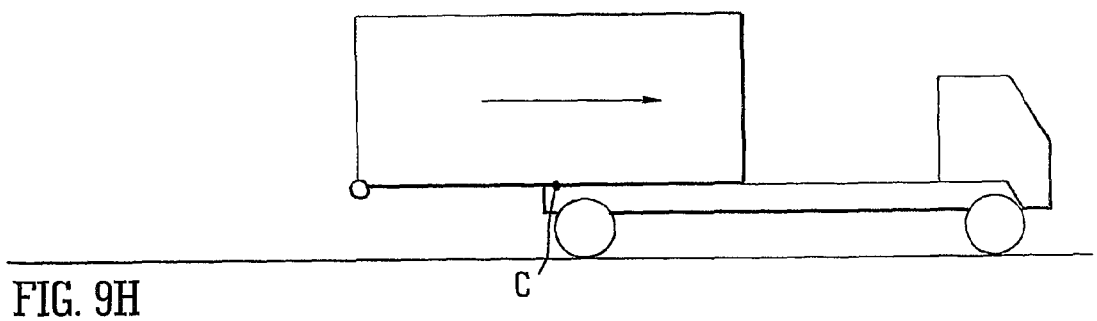

As shown in FIG. 9H, the body 100 is pulled onto the vehicle. Table 15 shows the feed-rate of motors 1 and 2 at this point.

TABLE 15

| Active Sensors: | Motors: |
| --- | --- |
| C: Body on vehicle | 1. 0% (able to be pulled out) |
|  | 2. 100% power feeding in |

Figure 9I:
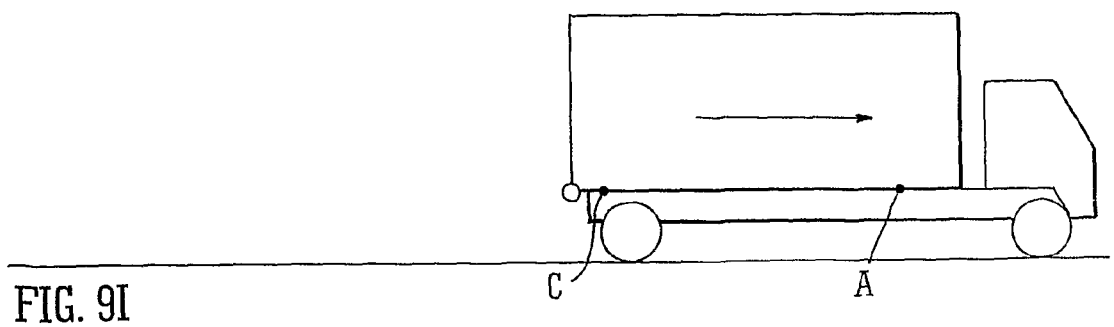

Finally, FIG. 9I shows that as the body 100 is pulled over sensor A, the body 100 automatically locks into place. Sensor A then switches motor 2 off. Both motors 1 and 2 are deactivated, as shown in Table 16. The vehicle can then be simply driven away.

TABLE 16

| Active Sensors: | Motors: |
| --- | --- |
| A. Body in lock position | None |
| C: Body on vehicle |  |

Figure 10A:
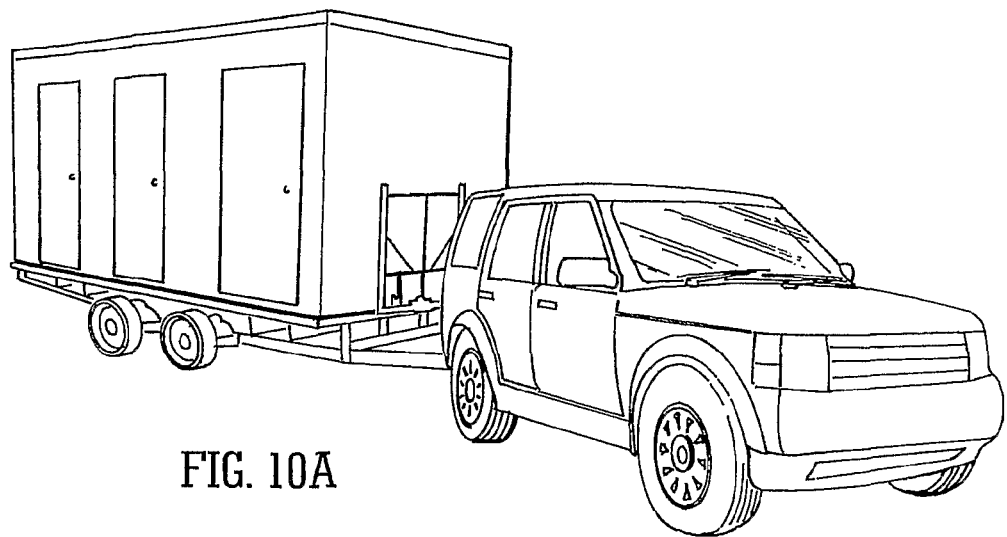
FIGS. 10A to 10C show how the present invention can be implemented as part of a trailer system.
Figure 10B:
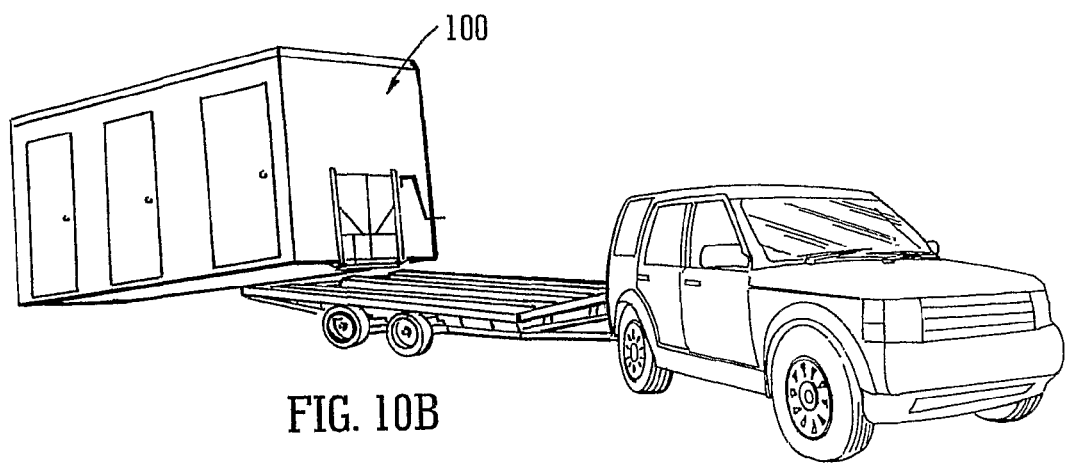
Figure 10C:
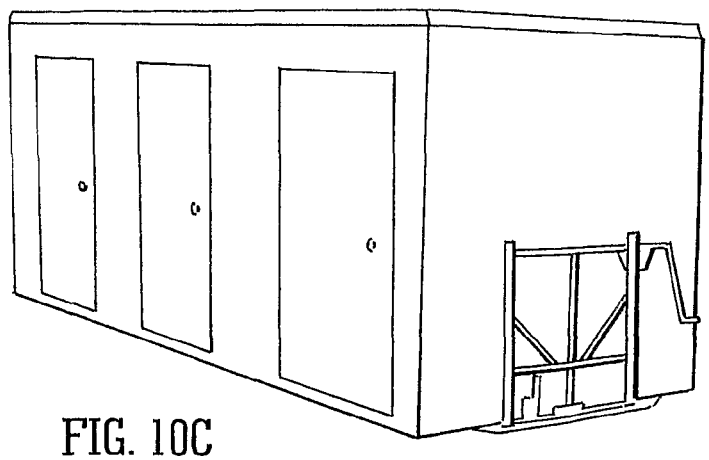

FIGS. 10A to 10C show how the present invention can also be implemented as part of a trailer 90. As before, the chassis frame 10 can be attachable or integrally formed with the trailer 90. In the example shown in FIGS. 10A to 10C, the vehicle body 100 is a toilet block. Clearly, being able to lower a toilet block directly onto ground level has enormous advantages in terms of disabled access. The skilled person will appreciate that the present invention can be implemented using any number of vehicle body types: for example, a box cab, a Luton cab, a flat deck, tipper, refrigerated rear cab, minibus, horse box, cement mixer, breakdown lorry, street light lift, bowsers and the like for liquid or bulk material, live stock carrying cabs, catering stands, mobile grandstands or mobile toilets etc. to be utilised for a variety of different purposes FIG. 11 is a perspective view from the rear which shows further detail of the tilt frame 28, mounted at the rear of the chassis frame 10, and the rear cable guide roller 20 which is used to guide the ON and OFF cables 68 and 70 when performing a mounting or demounting operation. FIG. 11 shows that a pair of spring retainer clips 110 are used to retain each off the ON cables 68 above the rear cable guide roller 20 when the connector plate 50 and ON and OFF cables 68 and 70, respectively, have been fed out. Without the spring clips 110, the ON cables 68 are able to move in various directions and can be inadvertently moved away by an operator from their correct position above the rear cable guide roller 20. During a mounting operation, as the connector plate 50 is pulled over the rear cable guide roller 20, the spring retainer clips 110 are able to disengage the ON cables 68 allowing the connector plate 50 to be pulled up towards the winch mechanism 18.

FIG. 12 shows further detail of one of the spring retaining clips 110 shown in FIG. 11, which consist of two fingers 112 which are mounted through pivots 114 to the chassis frame 10. A resilient member, such as a spring 118, biases the two fingers 112 together, and which effectively forms an aperture 116 capable of receiving and retaining the ON cable 68. The ON cable 68 is able to be pulled out of the spring retainer clip 110 only by a movement upwards in a direction away from the pivot point.

Various alterations and modifications may be made to the present invention without departing from the scope of the invention.

It is claimed:

1. A vehicle body exchange system for motor vehicles or trailers, comprising:
 a support frame attachable or integrally mounted with a motor vehicle chassis or trailer unit, said support frame having a front end located near a front of the motor vehicle chassis or trailer unit and a rear end located near a rear of the motor vehicle chassis or trailer unit, and wherein said support frame is capable of receiving a vehicle body;
 a first winch means connected to a coupling member for connection to said vehicle body to enable said vehicle body to be lifted from the ground or lowered to the ground during a mounting or demounting operation, said first winch means comprising a first motor which turns, via a gear mechanism, a single cable drum configured to pull the vehicle body off a motor vehicle;

a second winch means connected to the coupling member for connection to said vehicle body to enable said vehicle body to be lifted from the ground or lowered to the ground during said mounting or demounting operation, wherein said second winch means comprises a second motor which turns, via a gear mechanism, a twin cable drum configured to pull the vehicle body on to the vehicle;

means for independently controlling the rotational speed of said first and second winch means during said mounting and demounting operation to enable smooth displacement of said vehicle body; and a tilt frame mounted at the rear end of the support frame, said tilt frame configured to pivot in the direction of motion of said vehicle body relative to the support frame and support the vehicle body during said mounting and demounting operation.

2. The vehicle body exchange system as claimed in claim 1, wherein said support frame comprises at least two guide rails for receiving and guiding corresponding guide rollers on the demountable vehicle body.

3. The vehicle body exchange system as claimed in claim 2, wherein said guide rails and corresponding guide rollers enable the vehicle body to connect with said support frame during mounting or demounting operations.

4. The vehicle body exchange system as claimed in claim 2, further comprising a further set of guide rails provided along said support frame to ensure that said vehicle body is pulled on squarely and securely.

5. The vehicle body exchange system as claimed in claim 2, wherein the vehicle body comprises two L-shaped guide rails, which, in a mounted condition, sit on the guide rails of said support frame.

6. The vehicle body exchange system as claimed in claim 1, wherein the coupling member for connection to a vehicle body is provided as a connector plate.

7. The vehicle body exchange system as claimed in claim 6, wherein said vehicle body further comprises means for receiving the connector plate which is connected to the first and second winch means.

8. The vehicle body exchange system as claimed in claim 6, wherein the connector plate is secured via a locking bar.

9. The vehicle body exchange system as claimed in claim 1, further comprising a rear cable guide and an auxiliary guide roller located towards the rear of said support frame which, in use, guides the cables of the cable drums when performing said mounting or demounting operation.

10. The vehicle body exchange system as claimed in claim 9, further comprising a spring retaining means for retaining the cables of the cable drums near the rear cable guide.

11. The vehicle body exchange system as claimed in claim 1, further comprising a lock release handle mounted on the support frame which is engaged when the vehicle body is mounted securely on the support frame.

12. The vehicle body exchange system as claimed in claim 1, further comprising fixed roller wheels or additional torsion wheels inserted towards the rear of said support frame.

13. The vehicle body exchange system as claimed in claim 1, wherein the first motor is an induction motor capable of being pulled out when no power is applied.

14. The vehicle body exchange system as claimed in claim 1, wherein said second motor is a winch motor which cannot be pulled out when no power is applied.

15. The vehicle body exchange system as claimed in claim 1, further comprising a microcontroller or microprocessor to independently control the rotational speed of said first and second winch means.

16. The vehicle body exchange system as claimed in claim 15, further comprising a plurality of sensors to detect the relative position of the vehicle body relative to said support frame wherein the microcontroller or microprocessor receive as input the relative position from the plurality of sensors.

17. The vehicle body exchange system as claimed in claim 16, wherein said plurality of sensors further comprises a first sensor to detect when the vehicle body is locked in position on the support frame; a second sensor which senses when the vehicle body is in an unlocked position; a third sensor that is used to notify when the vehicle body is located on the support frame; and a fourth sensor which senses when the vehicle body is at the rear of a cable guide roller located towards the rear of the support frame.

18. The vehicle body exchange system as claimed in claim 17, wherein the first and second sensors are microswitches and the third and fourth sensors are capacitive sensors.

19. The vehicle body exchange system as claimed in claim 1, wherein any number of vehicle body types can be utilised and selected from a group consisting of: a box cab, a Luton cab, a flat deck, tipper, refrigerated rear cab, minibus, horse box, cement mixer, breakdown lorry, street light lift, bowsers for liquid or bulk material, live stock carrying cabs, catering stands, mobile control centres, mobile grandstands or mobile toilets or combinations thereof.

* * * * *